United States Patent
Tsai et al.

(10) Patent No.: US 7,440,051 B2
(45) Date of Patent: Oct. 21, 2008

(54) LIQUID CRYSTAL DISPLAY DEVICE WITH VARIOUS REFLECTIVE PATTERN ARRANGMENTS

(75) Inventors: Ching-Yu Tsai, Hsinchu (TW); Chih-Ming Chang, Jhongli (TW); Pin-Miao Liu, Sindian (TW)

(73) Assignee: Au Optronics Corp., Hsinchu (TW)

( * ) Notice: Subject to any disclaimer, the term of this patent is extended or adjusted under 35 U.S.C. 154(b) by 485 days.

(21) Appl. No.: 10/858,030

(22) Filed: Jun. 1, 2004

(65) Prior Publication Data
US 2005/0185119 A1 Aug. 25, 2005

(30) Foreign Application Priority Data
Feb. 25, 2004 (TW) .............................. 93104740 A

(51) Int. Cl.
*G02F 1/1335* (2006.01)
(52) U.S. Cl. .................... 349/113; 349/114; 349/106
(58) Field of Classification Search ..................... None
See application file for complete search history.

(56) References Cited

U.S. PATENT DOCUMENTS

| | | | | |
|---|---|---|---|---|
| 5,703,641 A | * | 12/1997 | Watanabe | 348/274 |
| 6,665,030 B2 | * | 12/2003 | Hanazawa et al. | 349/113 |
| 6,914,651 B1 | * | 7/2005 | Fujishiro | 349/113 |
| 6,995,898 B2 | * | 2/2006 | Otake et al. | 359/318 |
| 2003/0103178 A1 | * | 6/2003 | Sakamoto et al. | 349/113 |

* cited by examiner

*Primary Examiner*—David C. Nelms
*Assistant Examiner*—W. Patty Chen
(74) *Attorney, Agent, or Firm*—Thomas, Kayden, Horstemeyer & Risley

(57) ABSTRACT

A method for arranging reflective patterns for a liquid display (LCD) device. A substrate having at least one first pixel region and one second pixel region is provided, in which the first and second pixel regions have a reflector thereon, respectively, and the first pixel region is adjacent to the second pixel region. A first pattern is formed on the reflector on the first pixel region. A second pattern is formed on the reflector on the second pixel region, in which the second pattern is formed by dividing the first pattern into at least two pattern regions according to a predetermined direction and rearranging the pattern regions.

14 Claims, 5 Drawing Sheets

LIQUID CRYSTAL DISPLAY DEVICE WITH VARIOUS REFLECTIVE PATTERN ARRANGMENTS

BACKGROUND OF THE INVENTION

1. Field of the Invention

The present invention relates in general to a liquid crystal display (LCD) process, and more particularly, to a liquid crystal display device with various reflective patterns and a method for arranging the same.

2. Description of the Related Art

Due to the characteristics of thin profile and low power consumption, liquid crystal displays (LCDs) are widely employed in electronic products, such as portable personal computers, digital cameras, projectors, and the like. Generally, LCD devices are classified into transmissive, reflective, and transflective types. Transmissive LCDs are poorly suited for use in low power portable products due to the high power requirement of the backlight module. Moreover, brightness and contrast of the transmissive LCD are poor when the ambient light is bright.

Conversely, reflective LCDs provide adequate brightness and contrast as they use ambient light as the light source. Moreover, reflective LCDs can be employed in portable products as no backlight module is required. Additionally, transflective LCDs also uses ambient light as the light source. Moreover, transflective LCDs can further use an auxiliary backlight to enhance brightness and contrast when the ambient light is not bright enough.

Typically, the reflective type and transflective type LCD devices employ reflectors formed on the pixel regions to reflect the ambient light. Accordingly, image clarity is improved when the reflectors have a higher reflectivity. In order to increase the reflectivity of the reflector, the reflective pattern formed on the surface of the reflector usually has an uneven profile.

FIG. 1 is a plane view of a conventional reflective type LCD device wherein the pixels are arranged in a strip. The reflective LCD device comprises a lower substrate with a plurality of data lines 102 and a plurality of gate lines 104 thereon. The data lines 102 intersect the gate lines 104 to define pixel regions 108 to produce different primary colors (i.e. red, green, and blue colors). Each pixel region 108 has a reflector 106 and a reflective pattern 106a formed thereon. Since the reflective pattern 106a of each pixel region is the same, the moire effect may occur due to the regular structures. As a result, image quality of the reflective or transflective type LCD suffers.

SUMMARY OF THE INVENTION

Accordingly, an object of the present invention is to provide a novel liquid crystal display device with various reflective patterns and a method for arranging the same, in which a reflective pattern is divided and rearranged to form at least two distinct reflective patterns providing substantially equal reflectivity.

Another object of the present invention is to provide a novel liquid crystal display device with various reflective patterns and a method for arranging the same, which employs at least two distinct reflective patterns with substantially equal reflectivity to eliminate the moire effect on the LCD panel.

The above described and other objects and advantages, which will be apparent to one skilled in the art, are achieved in the present invention which is directed to, in a first aspect, a method for arranging reflective patterns for a liquid crystal display device. A substrate comprising a first pixel region and an adjacent second pixel region is provided, in which each of the first and second pixel regions has a reflector thereon. A first pattern is formed on the reflector on the first pixel region. A second pattern is formed on the reflector on the second pixel region, in which the second pattern is formed by dividing the first pattern into at least two pattern regions and rearranging the pattern regions.

In another aspect of the invention, a liquid crystal display device with various reflective pattern arrangements is provided. The liquid crystal display device comprises a substrate, a first reflector, and a second reflector. The substrate has a first pixel region and an adjacent second pixel region. The first reflector is disposed on the first pixel region and has a first pattern thereon. The second reflector is disposed on the second pixel region and has a second pattern thereon, which is formed by dividing the first pattern into at least two pattern regions and rearranging the pattern regions.

In yet another aspect of the invention, a method for arranging reflective patterns for a liquid crystal display device is provided. A substrate having a series of first pixel regions and a series of adjacent second pixel regions is provided, in which each of the first and second pixel regions has a reflector thereon. At least two distinct patterns with substantially equal reflectivity are alternated on the reflectors on the first pixel regions. The patterns with substantially equal reflectivity are alternated on the reflectors on the second pixel regions, wherein each pattern on the second pixel regions corresponding to that on the first pixel regions is different.

In still another aspect of the invention, a liquid crystal display device with various reflective pattern arrangements is provided. The liquid crystal display device includes a substrate, a plurality of first reflectors, and a plurality of second reflectors. The substrate has a series of first pixel regions and a series of adjacent second pixel regions. The first reflectors are correspondingly disposed on the series of first pixel regions and have at least two distinct patterns with substantially equal reflectivity alternated thereon. The second reflectors are correspondingly disposed on the series of second pixel regions and have patterns with substantially equal reflectivity alternated thereon, in which each pattern on the second pixel regions corresponding to that on the first pixel regions is different.

DESCRIPTION OF THE DRAWINGS

The present invention will become more fully understood from the detailed description given hereinbelow and the accompanying drawings, given by way of illustration only and thus not intended to be limitative of the present invention.

FIG. 4b illustrates an LCD device with various reflective pattern arrangements according to FIG. 4a.

FIG. 5b illustrates an example of an LCD device with various reflective pattern arrangements according to FIG. 5a.

FIG. 5c illustrates another example of an LCD device with various reflective pattern arrangements according to FIG. 5a.

DETAILED DESCRIPTION OF THE INVENTION

Figure 1:
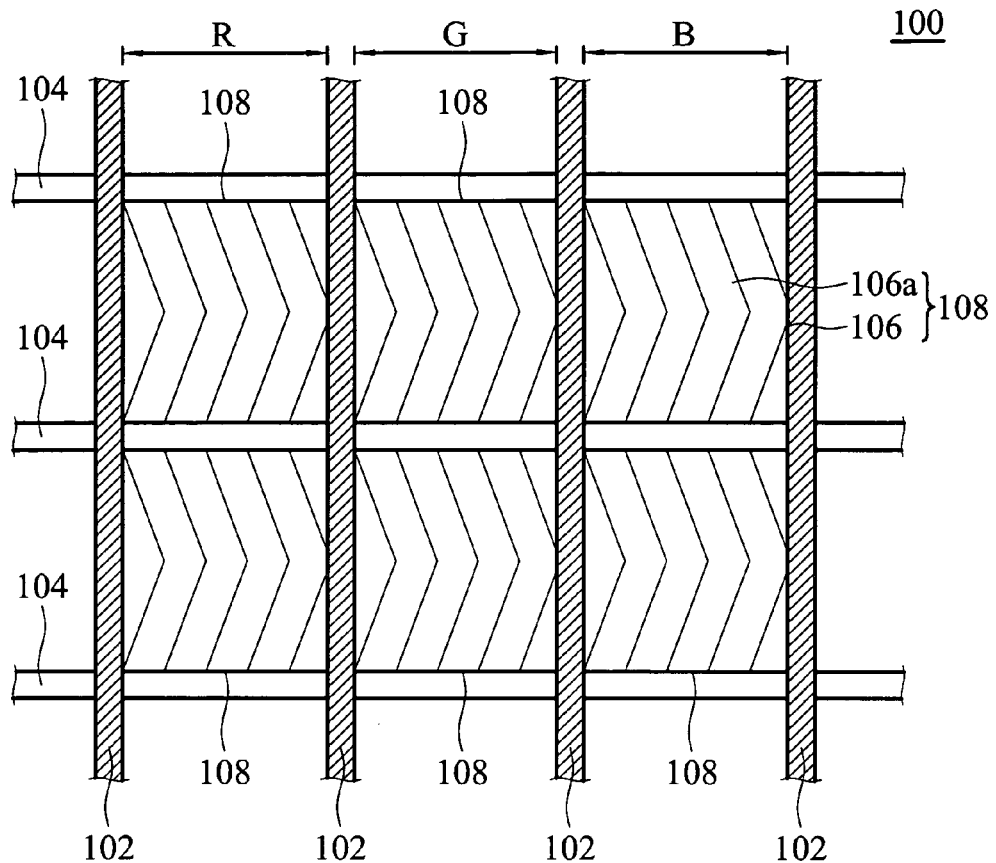
FIG. 1 is a plane view of a conventional reflective type LCD device wherein the pixels are arranged in a strip.
Figure 2:
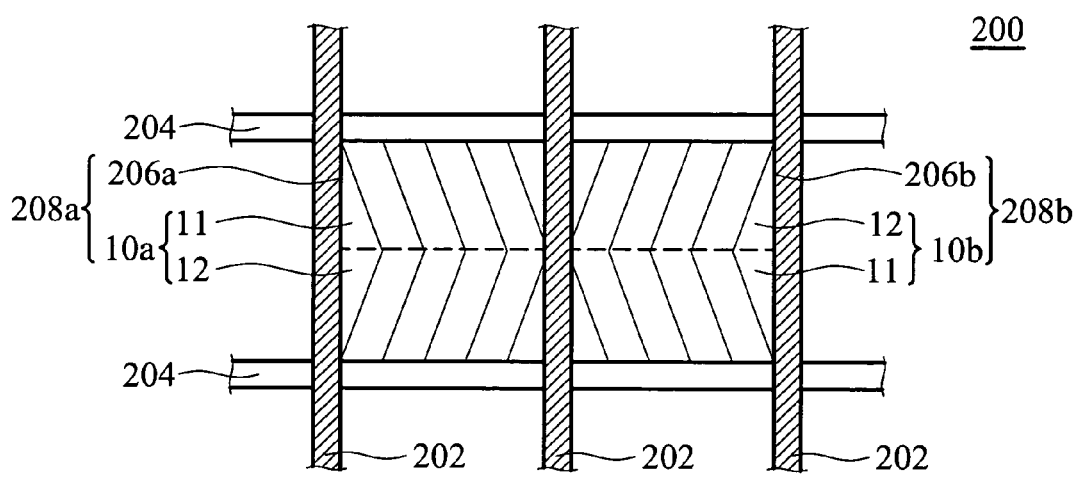
FIG. 2 is a plane view of an LCD device with various reflective pattern arrangements according to a first embodiment of the invention.

FIG. 2 is a plane view of an LCD device with various reflective pattern arrangements according to a first embodiment of the invention. The LCD device includes a substrate 200, a first reflector 206a, and a second reflector 206b. In this embodiment, the substrate 200 can be a lower substrate for a reflective or transflective type LCD, which has a plurality of data lines 202 and a plurality of gate lines 204 thereon. The data lines 202 intersect the gate lines 204 to define pixel regions. In order to simplify the diagram, only a first pixel region 208a and an adjacent second pixel region 208b are depicted. Here, the first pixel and second pixel regions 208a and 208b may be used to display the same primary color, such as red (R), green (G), or blue (B). Moreover, the first pixel and second pixel regions 208a and 208b may be used to display different primary colors, such as red and green, green and blue, or blue and red.

The first and second reflectors 206a and 206b may be a reflective layer comprising, for example, aluminum or silver. Moreover, the first and second reflectors 206a and 206b are respectively disposed on the first and second pixel regions 208a and 208b. A first pattern 10a is formed on the surface of the first reflector 206a to serve as a reflective pattern. A second pattern 10b is also formed on the surface of the second reflector 206b to serve as the reflective pattern.

The method for arranging the reflective patterns 10a and 10b on the first and second reflectors 206a and 206b includes the following steps. First, the first pattern 10a is provided on the first reflector 206a. Next, the first pattern 10a is used as a base pattern and divided into at least two pattern regions according to a predetermined direction, such as a direction parallel to the data lines 202 or the gate lines 204. For example, the first pattern 10a is divided into two pattern regions 11 and 12 according the direction parallel to the gate line 204. Thereafter, the pattern regions 11 and 12 are rearranged to form the second pattern 10b on the second reflector 206b. Hence, the pattern region 11 of the second pattern 10b is adjacent to the pattern region 12 of the first pattern 10a and the pattern region 12 of the second pattern 10b is adjacent to the pattern region 11 of the first pattern 10a. Since the adjacent reflective patterns 10a and 10b are different, the moire effect can be reduced. Moreover, since the second pattern 10b is formed by dividing and rearranging the first pattern 10a, the first pattern 10a has a reflectivity substantially equal to the second pattern 10b. Accordingly, image quality of the reflective or transflective LCD devices can be improved.

FIGS. 3, 4a-4b, and 5a-5c illustrate LCD device with various reflective pattern arrangements and a method for arranging the same according to a second embodiment of the invention.

Figure 3:
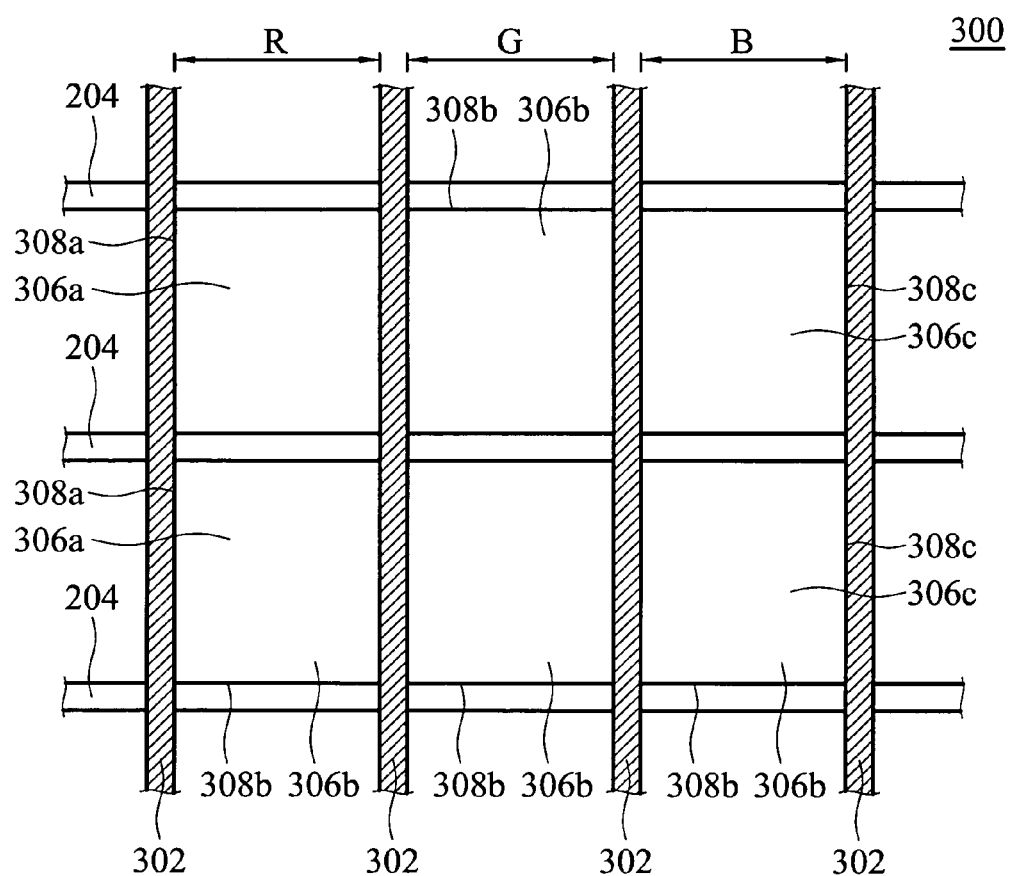
FIG. 3 is a plane view of an LCD device with various reflective pattern arrangements according to a second embodiment of the invention.

FIG. 3 is a plane view of an LCD device with various reflective pattern arrangements. The LCD device includes a substrate 300, a plurality of first reflectors 306a, a plurality of second reflectors 306b, and a plurality of third reflectors 306c. In this embodiment, the substrate 300 can be a lower substrate for a reflective or transflective type LCD, which has a plurality of data lines 302 and a plurality of gate lines 304. These data lines 302 intersect the gate lines 304 to define a series of first pixel regions 308a, a series of second pixel regions 308b, and a series of third pixel regions 308c. The first pixel regions 308a and the third pixel regions 308c are respectively adjacent to the second pixel regions 308b. Moreover, each first pixel region 308a corresponds to one second pixel region 308b and one third pixel region 308c. Here, the first, second, and third pixel regions 308a, 308b, and 308c may be used of display different primary colors, such as red, green, and blue, respectively.

Pluralities of first, second, and third reflectors 306a, 306b, 306c may be reflective layers comprising, for example, aluminum or silver. Moreover, each of the first, second, and third reflectors 306a, 306b, 306c is respectively disposed on each of the first, second, third pixel regions 308a, 308b, and 308c.

Next, at least two distinct patterns with substantially equal reflectivity are alternated on the surfaces of the first reflectors 306a to serve as reflective patterns. Patterns with substantially equal reflectivity are also alternated on the surfaces of the second and third reflectors 306b and 306c, respectively, to serve as reflective patterns. Here, each reflective pattern on the second pixel regions 308b (or second reflectors 306b) is different from the adjacent reflective pattern on the first pixel regions 308a (or first reflectors 306a) and the adjacent reflective pattern on the third pixel regions 308c (or third reflectors 306c).

Figure 4A:
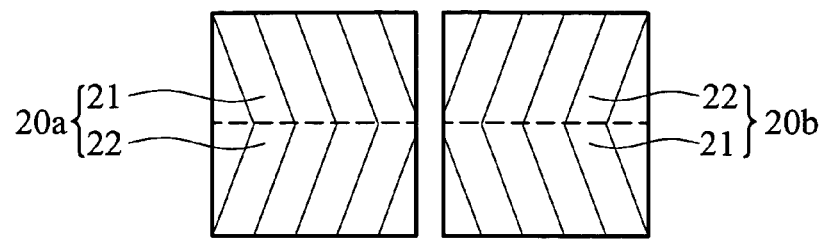
FIG. 4a illustrates two distinct reflective patterns with substantially equal reflectivity according to a second embodiment of the invention.
Figure 4B:
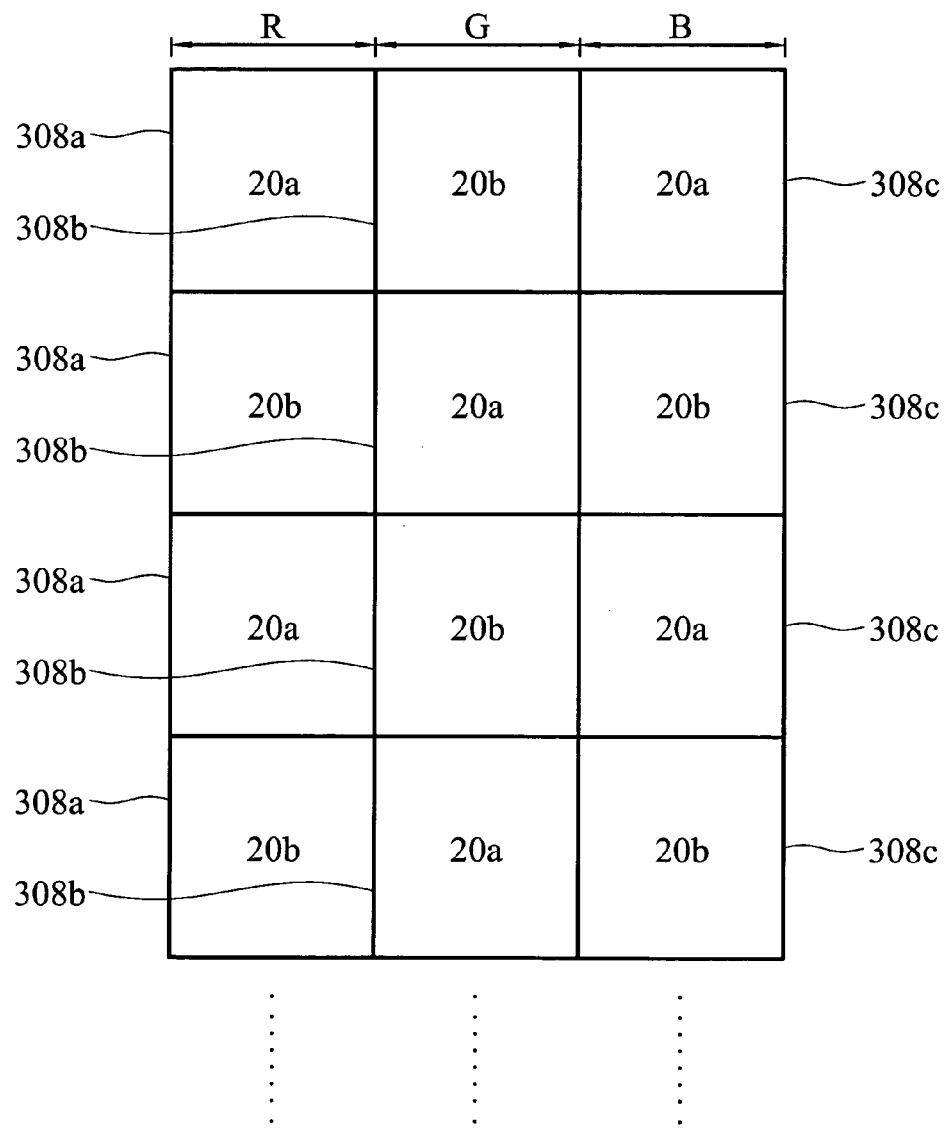

Referring to FIGS. 4a and 4b, wherein FIG. 4a illustrates two distinct reflective patterns with substantially equal reflectivity and FIG. 4b illustrates an LCD device with various reflective pattern arrangements according to FIG. 4a. In FIG. 4a, a second pattern 20b is formed by dividing a first pattern 20a into two pattern regions 21 and 22 and rearranging the patterns 21 and 22. Accordingly, the second pattern 20b has a reflectivity substantially equal to first pattern 20a. Moreover, the pattern region 21 of the second pattern 20b corresponds to the pattern region 22 of the first pattern 20a and the pattern region 22 of the second pattern 20b corresponds to the pattern region 21 of the first pattern 20a.

Next, the patterns 20a and 20b are alternated on the series of first pixel regions 308a according to a sequence of the first pattern 20a and the second pattern 20b. Next, the patterns 20a and 20b are alternated on the series of second pixel regions 308b according to a reversed sequence of the second pattern 20b and the first pattern 20a. Finally, the patterns 20a and 20b are alternated on the series of third pixel regions 308c according to the same sequence of the first pattern 20a and the second pattern 20b, as shown in FIG. 4b. As mentioned above, since the reflective patterns on the adjacent pixel regions are different, the moire effect can be reduced. Moreover, image quality of the reflective or transflective LCD devices can be improved due to the reflective patterns having a substantially equal reflectivity.

Figure 5A:
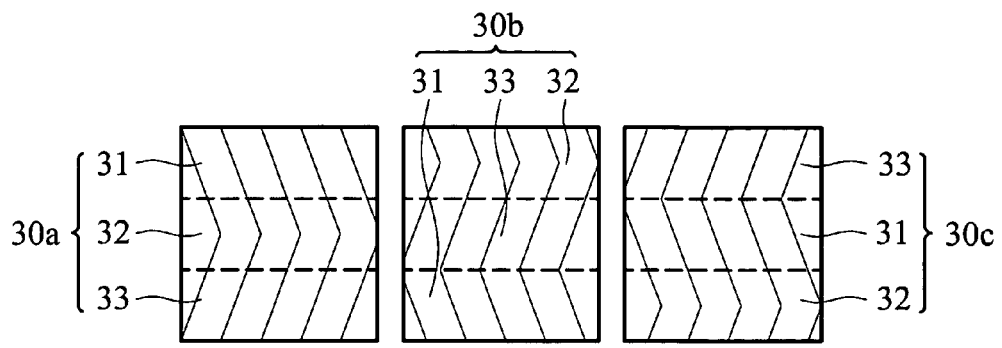
FIG. 5a illustrates three distinct reflective patterns with substantially equal reflectivity according to a second embodiment of the invention.
Figure 5B:
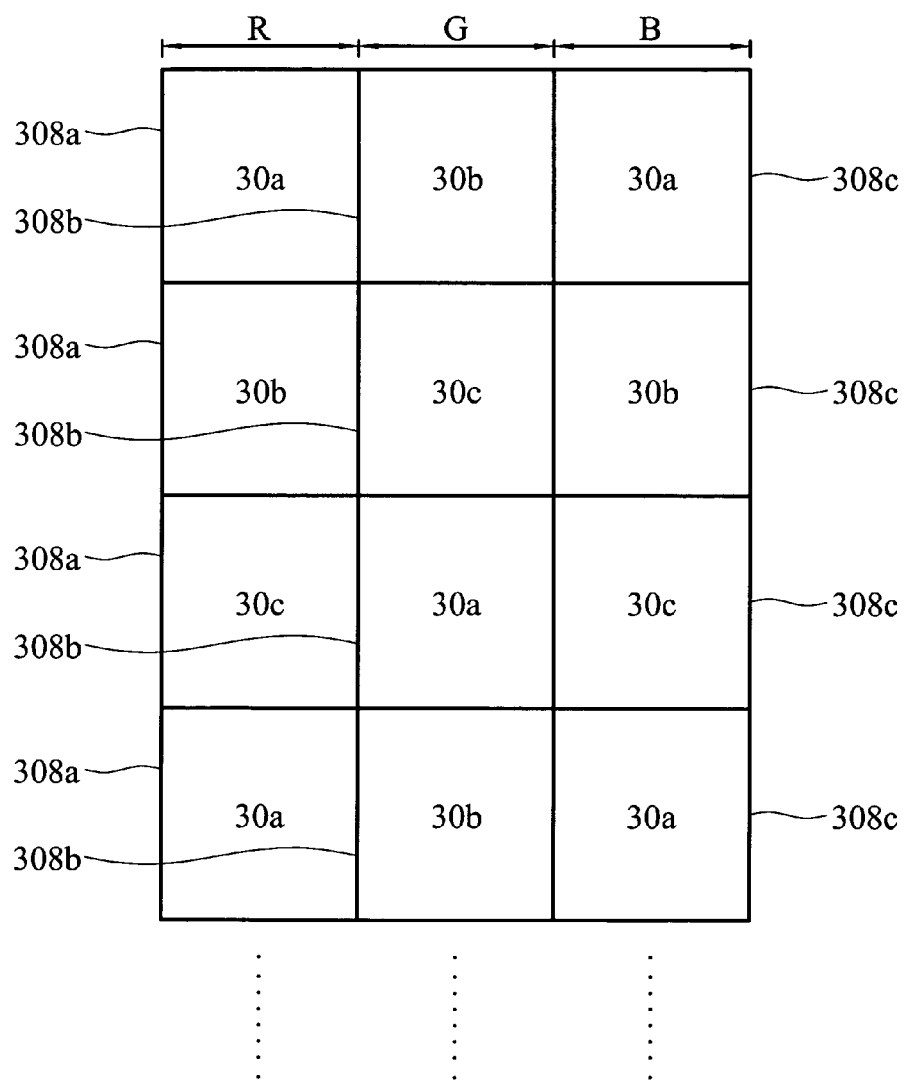
Figure 5C:
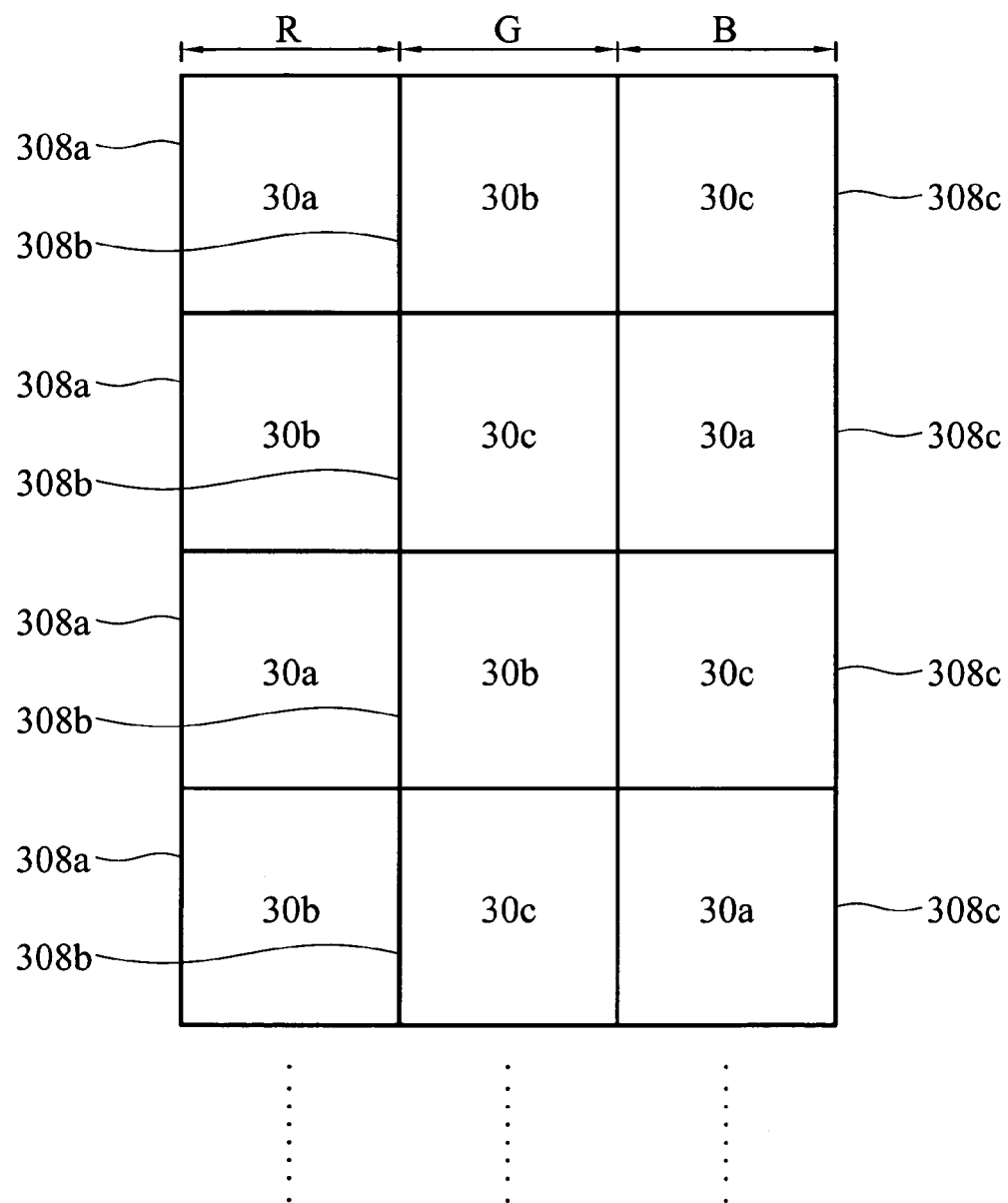

Next, referring to FIGS. 5a to 5c, wherein FIG. 5a illustrates three distinct reflective patterns with substantially equal reflectivity according to a second embodiment of the invention, FIG. 5b and FIG. 5c illustrate examples of an LCD device with various reflective pattern arrangements according to FIG. 5a. In FIG. 5a, a second pattern 30b and a third pattern 30c are respectively formed by dividing the first pattern 30a into three pattern regions 31, 32, and 33 and rearranging the pattern regions 31, 32, and 33. Accordingly, the second and third pattern 30b and 30c have a reflectivity substantially equal to the first pattern 30a. Moreover, the pattern region 31 of the first pattern 30a respectively corresponds to the pattern region 32 of the second pattern 30b and the pattern region 33 of the third pattern 30c, the pattern region 32 of the first pattern 30a respectively corresponds to the pattern region 33 of the second pattern 30b and the pattern region 31 of the third pattern 30c, and the pattern region 33 of the first pattern 30a respectively corresponds to the pattern region 31 of the second pattern 30b and the pattern region 32 of the third pattern 30c.

Next, the patterns 30a, 30b, and 30c are alternated on the series of first pixel regions 308a according to a sequence of the first pattern 30a, the second pattern 30b, and the third pattern 30c. Next, the patterns 30a, 30b, and 30c are alternated on the series of second pixel regions 308b according to a sequence of the second pattern 30b, the third pattern 30c, and the first pattern 30a. Finally, the patterns 30a, 30b, and 30c are alternated on the series of third pixel regions 308c according to the same sequence of the first pattern 30a, the second pattern 30b, and the third pattern 30c, as shown in FIG. 5b. Additionally, the patterns 30a and 30b may be alternated on the series of first pixel regions 308a according to a sequence of the first pattern 30a and the second pattern 30b. Next, the patterns 30b and 30c may be alternated on the series of second pixel regions 308b according to a sequence of the second pattern 30b and third pattern 30c. Finally, the patterns 30c and 30a may be alternated on the series of third pixel regions 308c according to a sequence of the third pattern 30c and the first pattern 30a, as shown in FIG. 5c.

Moreover, in FIGS. 5b and 5c, the total number of each distinct reflective pattern 30a, 30b, and 30c on the first pixel regions 308a, the second pixel regions 308b, or the third pixel regions 308c is substantially equal. Moreover, the total number of each distinct reflective pattern 30a, 30b, and 30c on the first pixel regions 308a is substantially equal to that on the second pixel regions 308b and that of the third pixel regions 308c.

According to this embodiment, since the reflective patterns on the adjacent pixel regions are different, the moire effect can be reduced. Moreover, image quality of the reflective or transflective type LCD can be improved due to the reflective patterns having a substantially equal reflectivity.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A method for arranging reflective patterns for a liquid crystal display device, comprising:
   providing a substrate having a first pixel region and an adjacent second pixel region used for displaying the same primary color, each of the first and second pixel regions having a reflector thereon;
   forming a first pattern on the reflector on the first pixel region; and
   forming a second pattern on the reflector on the second pixel region, wherein the second pattern is formed by dividing the first pattern into at least two pattern regions and rearranging the pattern regions.

2. The method as claimed in claim 1, wherein the substrate further has a third pixel region adjacent to the first pixel region, having a reflector thereon and used for displaying a different primary color from the first pixel region.

3. The method as claimed in claim 2, further forming a third pattern on the reflector on the third pixel region, wherein the third pattern is formed by dividing the first pattern into at least two pattern regions and rearranging the pattern regions.

4. The method as claimed in claim 1, wherein the first pattern is divided into the pattern regions according to a predetermined direction.

5. A liquid crystal display device with various reflective pattern arrangements, comprising:
   a substrate having a first pixel region and an adjacent second pixel region used for displaying the same primary color;
   a first reflector disposed on the first pixel region and having a first pattern thereon; and
   a second reflector disposed on the second pixel region and having a second pattern thereon, which is formed by dividing the first pattern into at least two pattern regions and rearranging the pattern regions.

6. The liquid crystal display device as claimed in claim 5, wherein the substrate further has a third pixel region adjacent to the first pixel region, used for displaying a different primary color from the first pixel region.

7. The liquid crystal display device as claimed in claim 6, further comprises a third reflector disposed on the third pixel region, having a third pattern thereon, which is formed by dividing the first pattern into at least two pattern regions and rearranging the pattern regions.

8. The liquid crystal display device as claimed in claim 5, wherein the first pattern is divided into the pattern regions according to a predetermined direction.

9. A method for arranging reflective patterns for a liquid crystal display device, comprising:
   providing a substrate having a series of first pixel regions and a series of adjacent second pixel regions, each of the first and second pixel regions having a reflector thereon;
   alternately arranging at least two distinct patterns with substantially equal reflectivity on the reflectors on the first pixel regions, wherein the patterns with substantially equal reflectivity are formed comprising:
   providing a first pattern;
   dividing the first pattern into at least two pattern regions according to a predetermined direction; and
   rearranging the pattern regions to form at least one second pattern; and
   alternately arranging the patterns with substantially equal reflectivity on the reflectors on the second pixel regions, wherein each pattern on the second pixel regions corresponding to that on the first pixel regions is different.

10. The method as claimed in claim 9, wherein the total number of each distinct pattern on the first pixel regions or on the second pixel regions is substantially equal.

11. The method as claimed in claim 9, wherein the total number of each distinct pattern on the first pixel regions is substantially equal to that on the second pixel regions.

12. A liquid crystal display device with various reflective pattern arrangements, comprising:
   a substrate having a series of first pixel regions and a series of adjacent second pixel regions;
   a plurality of first reflectors correspondingly disposed on the series of first pixel regions and having at least two distinct patterns with substantially equal reflectivity alternated thereon, wherein the patterns with substantially equal reflectivity comprises:
   a first pattern; and
   at least one second pattern formed by dividing the first pattern into at least two pattern regions according to a predetermined direction and rearranging the pattern regions; and
   a plurality of second reflectors correspondingly disposed on the series of second pixel regions and having the patterns with substantially equal reflectivity alternated thereon, wherein each pattern on the second pixel regions corresponding to that on the first pixel regions is different.

13. The liquid crystal display device as claimed in claim 12, wherein the total number of each distinct pattern on the first pixel regions or on the second pixel regions is substantially equal.

14. The liquid crystal display device as claimed in claim 12, wherein the total number of each distinct pattern on the first pixel regions is substantially equal to that on the second pixel regions.

* * * * *